AUTOMATIC FREQUENCY CONTROL SYSTEM

Filed May 23, 1966

INVENTOR.
WAYNE W. EVANS
BY
Eugene M. Whitacre
Attorney 3,469,025
AUTOMATIC FREQUENCY CONTROL SYSTEM
Wayne Wheeler Evans, Indianapolis, Ind., assignor to RCA Corporation, a corporation of Delaware
Filed May 23, 1966, Ser. No. 552,090
Int. Cl. H04n 7/04, 7/06, 5/60
U.S. Cl. 178—5.8 6 Claims

ABSTRACT OF THE DISCLOSURE

An automatic frequency control system is provided which includes a frequency responsive network coupled to receive a video carrier and means for providing an output direct voltage indicative of the received video carrier. The voltage versus frequency characteristic of the frequency responsive network is of a first polarity for a first frequency range, an alternate polarity for a successively higher frequency range and of the first polarity for a frequency range higher than the first and second frequency ranges.

This invention relates to automatic frequency control system and in particular to a system for obtaining a frequency dependent error correction voltage to control the local oscillator frequency of a television receiver tuner.

When an operator rotates a detented or pre-programmed channel selector of a television receiver and adjusts the fine tuning control of the instrument, he is actually varying the frequency of a local oscillator (L.O.) in the tuner. The output of this oscillator is compared to, or beat with, the radio frequency (R.F.) television signal received from the receiver antenna. This beating action creates both the sum and difference frequencies along with the original R.F. and L.O. frequencies. All but the difference frequencies, called intermediate (I.F.) frequencies, are filtered out. These I.F. frequencies are amplified and detected in the normal manner to recreate the desired sound and picture information. If for any reason the L.O. is not set at the proper frequency (mistuned), the I.F. frequencies will be incorrect, yielding distortion and interference in the sound and picture information. In particular, mistuning can occur due to improper fine tuning on the part of the operator, local oscillator drift, or the non-resetability of the mechanical detenting action of the tuner.

It is an object of the present invention to provide a system for automatically eliminating the aforementioned distortion and interference caused by mistuning of the tune of a television receiver.

It is another object of the present invention to provide a system for automatically sensing and correcting errors in the local oscillator frequency of a television tuner during operation of the television receiver.

It is a further object of the present invention to provide an improved frequency discriminator network for obtaining an error correction voltage which varies as a function of thef requency of an applied signal.

In a television receiver of the type having a tuner for converting a received television signal having video and sound carrier waves to a corresponding signal of intermediate frequency having video and sound carrier waves, and an intermediate frequency amplifier for said intermediate frequency signal having a frequency-amplitude response which is sloping with respect to the video carrier so that lower frequency video carrier sidebands are amplified more than higher frequency carrier sidebands, there is included an automatic frequency control system having a frequency responsive network coupled to receive said video carrier. A first circuit loop is provided which includes at least a portion of said frequency responsive network, a first rectifier and a load impedance element. A second circuit loop includes at least another portion of said frequency responsive network, another rectifier and a second load impedance element with said first circuit loop being more responsive to higher frequency video carrier sidebands than said second circuit loop, and said second circuit loop being more responsive to said lower frequency video carrier sidebands than said first circuit loop. Means are also provided for reverse biasing said second rectifier with respect to said first rectifier and for coupling said first and second impedance elements to said tuner for providing a direct voltage indicative of the frequency of said video carrier to control the frequency of the converted intermediate frequency signal.

The novel features that are considered characteristic of the invention are set forth in the appended claims. The invention itself, however, both as to its organization and method of operation will best be understood when read in connection with the accompanying drawings in which:

Figures 1, 2, 3, 4, 5, 6, 7, 8:
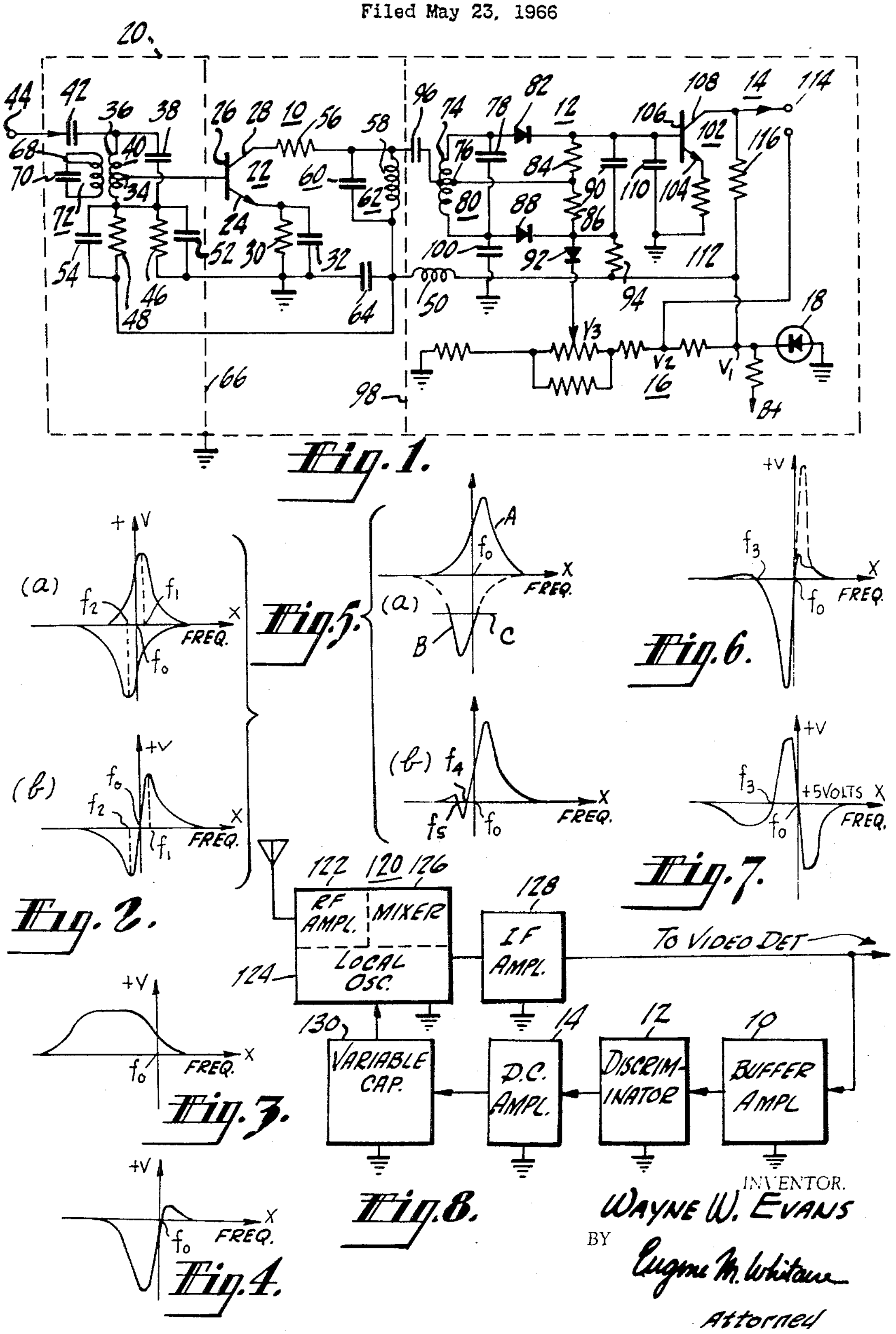
FIGURE 1 is a schematic diagram of an automatic frequency control system embodying the invention.
FIGURE 2 is a voltage vs. frequency response characteristic of a conventional frequency sensitive discriminator for an amplitude limited varying frequency input signal.
FIGURE 3 is the voltage vs. frequency response characteristic obtained at the output of a television receiver video I.F. amplifier due to a varying frequency input signal.
FIGURE 4 is a voltage vs. frequency response characteristic of a conventional frequency discriminator for a non-amplitude limited varying frequency input signal obtained from the output of a television receiver video I.F. amplifier.
FIGURE 5 is a voltage vs. frequency response characteristic of the discriminator of the present invention for an amplitude limited varying frequency input signal.
FIGURE 6 is a voltage vs. frequency response characteristic of the discriminator of the present invention for a non-amplitude limited varying frequency input signal obtained from the output of a television receiver video intermediate frequency amplifier.

FIGURE 7 is a voltage vs. frequency response characteristic of the A.F.C. system of the present invention for a non-amplitude limited varying frequency input signal obtained from the output of a television receiver video intermediate frequency amplifier; and FIGURE 8 is a block diagram of the A.F.C. system of the present invention as applied to the tuner and intermediate frequency amplifier sections of a television receiver.

Referring now to FIGURE 1, there is illustrated a schematic diagram of an automatic frequency control system (A.F.C.) embodying the invention and suitable for use in a conventional type television receiver. The system operates to supply an output error correction D.C. voltage which varies as a function of the frequency of the applied input signal. For ease of understanding, the A.F.C. system may be considered to be comprised of three stages, a buffer amplifier 10, a frequency discriminator 12 and a D.C. amplifier 14. Power to energize the system may be obtained from a suitable B+ operating potential supply (not shown) in the television receiver in which the A.F.C. system is incorporated. The B+ supply is reduced down to the A.F.C. system required operating potentials $V_1$, $V_2$ and variable bias potential $V_3$ by means of a resistive network 16 acting as a low impedance bleeder. Regulation of potentials $V_1$, $V_2$ and $V_3$ is provided by a Zener diode 18 connected as shown and having a reverse breakdown voltage equal to $V_1$.

In a preferred embodiment of the invention, the A.F.C.

system is housed in a compact metal enclosure, indicated schematically by the dashed rectangle 20, connected to ground to provide shielding of the system from the component sections of the television receiver.

The buffer stage 10 includes a transistor 22 having respective emitter, base and collector electrodes 24, 26, and 28. The emitter electrode 24 is connected to ground through a resistor 30 which is bypassed at signal frequencies by a capacitor 32. The base electrode 26 is connected to a tap 34 on the inductor element 36 of an inductor 36 capacitor 38 resonant circuit 40. One end of the resonant circuit 40 is connected through a coupling capacitor 42 to a terminal 44 which serves as a signal input connection to the buffer stage 10. The other end of the resonant circuit 40 is connected to the junction of resistors 46 and 48. Resistors 46 and 48 comprise the base 26 bias network. A connection is made from resistor 48 through a signal decoupling choke 50 to the tap $V_1$ on the bleeder network 16. Resistor 46 is signal bypassed to ground by capacitor 52 while resistor 48 is shunted by a capacitor 54 to provide a small amount of collector circuit to base circuit neutralization.

The collector electrode 28 is connected through a resistor 56 to one end of an inductor 58-capacitor 60 resonant circuit 62. The other end of the resonant circuit is connected to ground through a signal bypass capacitor 64 and to potential tap $V_1$ through the decoupling choke 50.

A grounded shield, schematically indicated at 66, is included between the base and collector resonant circuits 40 and 62 in order to minimize the possibility of oscillations occurring between the collector and base circuits due to the crowding of the circuit components in the compact enclosure 20.

A connection is made from the output circuit of the video I.F. amplifier of a television receiver to sample a portion of an intermediate frequency video signal appearing thereat and apply same to the input terminal 44 of the buffer stage 10. In effect, the stage 10 is another video I.F. amplifier with its base and collector resonant circuits 40 and 62 tuned to 45.75 mc., the I.F. video carrier. An inductor 68-capacitor 70 absorption trap 72 tuned to approximately 47.25 mc. is placed next to the base resonant circuit 40 and is used as a means of controlling the high (I.F.) frequency pull-in range of the A.F.C. system so as to reduce the undesirable effects of an adjacent channel sound carrier as will be hereinafter explained.

Referring now to the discriminator 12, an inductor 74 center tapped at 76 is shunted by a capacitor 78 to provide a circuit 80 parallel resonant at the I.F. video carrier or reference frequency of 45.75 mc. A rectifier 82 is connected between the top end of the circuit 80 and one end of a pair of series connected load resistors 84 and 86. The bottom end of the circuit 80 is connected through another rectifier 88 to the other end of the series connected resistors 84 and 86 and a connection is made from the inductor center tap 76 to the junction of said resistors 84 and 86 to provide a symmetrical bridge circuit configuration between both ends of circuit 80. A capacitor 90 is shunted across the series connected resistors 84 and 86 and a return path to ground is provided through a diode 92, resistor 94 and the bleeder network 16.

It will be recognized that the discriminator circuit so far described resembles known circuits in the general arrangement of the rectifiers 82 and 88 in balanced relation between the tank circuit 80 and the shunt capacitor 90. I.F. signal coupling from the buffer stage 10 is through a capacitor 96 connected between the buffer stage collector circuit 62 and the inductor center tap 76. In order to minimize the interaction in tuning between resonant circuits 62 and 80, a grounded metal shield 98 is positioned within the enclosure 20 between the buffer amplifier circuit 62 and the discriminator circuit 80. Because of the shield 98, the proper discriminator phase relationships between the signal coupled from the buffer stage 10 and the signal developed across the discriminator resonant circuit inductor 74 is not translated by means of magnetic coupling, but instead are translated by means of a capacitance unbalance to ground between the top and bottom ends of the discriminator circuit 80. In addition, a small capacitor 100 is connected between the circuit 80 bottom end and ground to insure a desired direction of a capacitance unbalance and the establishment of the proper phase relationships for a frequency sensitive discriminator action. The shield 98 also provides isolation of the discriminator rectifiers and the inherent noise generated from the input circuit of the buffer stage 10, and hence, from the I.F. amplifier of the television receiver from which the I.F. signal sample is taken. This isolation greatly reduces the chances of internal oscillation between the A.F.C. system and the receiver I.F. amplifier, along with the reduction of the possibility of beats occurring between frequencies generated in the A.F.C. system and the I.F. amplifier section of the receiver.

The discriminator circuit so far described is so arranged that from the top end of the circuit 80 to ground, the discriminator is more responsive to frequencies above the reference frequency, and from the bottom end of the circuit 80 to ground, the discriminator is more responsive to frequencies below the reference frequency, thus, the circuit 80 and rectifiers 82 and and 88 are effective as a detector for variable frequency signals around the reference frequency and provides a maximum output voltage across the capacitor 90 at some frequencies $f_1$ and $f_2$ respectively above and below the reference frequency $f_0$ or 45.75 mc. The voltage vs. frequency characteristic response curve for a discriminator circuit of this type with an amplitude limited input signal is shown in FIGURES 2*a* and 2*b*. FIGURE 2*a* shows the response characteristic for the voltage developed across load resistors 84 and 86 as a function of the frequency of the discriminator input signal, while FIGURE 2*b* is equal to the summation of these two curves and therefore the response characteristic of the voltage developed across the output capacitor 90. As would be expected, the curve (FIGURE 2*b*) crosses the frequency or X axis at only one point, the reference frequency $f_0$ to which the discriminator resonant circuit 80 is tuned. Due to the amplitude limited input signal, the portion of the curve (FIGURE 2*b*) created by frequencies higher than the reference frequency ($f_0$) is symmetrical in amplitude and bandwidth to that portion of the curve created by frequencies lower than the reference frequency ($f_0$).

In FIGURE 3 the voltage vs. frequency response characteristic obtained at the output of a television receiver video I.F. amplifier due to a varying frequency input signal is shown. If a frequency ($f_0$) equal to 45.75 mc., the I.F. video carrier, is selected as the reference frequency of a conventional discriminator and a varying frequency output of a video I.F. amplifier (FIGURE 3) is applied thereto, the characteristic response curve shown in FIGURE 4 will be obtained. It will be noted that due to the non-amplitude limited characteristic of the applied signal, the response characteristic of the conventional discriminator is not symmetrical about the frequency or X axis in either bandwidth or amplitude.

In accordance with the invention, a D.C. bias voltage is developed across load resistors 84 and 86 such that rectifier 88 is reverse biased. The output voltage vs. frequency response characteristic curve obtained across capacitor 90 is altered from that developed from a discriminator with non-biased rectifiers, so as to provide an output response characteristic curve which not only crosses the frequency axis at the reference frequency ($f_0$) and also crosses the frequency or X axis at a second point $f_3$ which is lower in frequency than $f_0$.

In accordance with a preferred embodiment of the invention a D.C. amplifier stage 14 is provided and which is coupled to the output of the discriminator 12 and biased such that a base current is caused to flow in direct current circuit path through the series connected resistors 84 and 86 for developing a D.C. bias potential thereacross.

Amplifier stage 14 includes a transistor 102 having respective emitter, base and collector electrodes 104, 106 and 108. The base electrode 106 is connected to the junction of resistor 84 and rectifier 82 to provide a path for base curernt flow through the resistors 84 and 86. Connection is made from the aforesaid junction of the rectifier 82 and resistor 84 to ground through an I.F. signal bypass capacitor 110. The transistor emitter electrode 104 is connected to ground through a resistor 112, and the collector electrode 108 is connected to a terminal 114 which serves as the signal output tap for the A.F.C. system. Operating potential for the collector 108 is obtained from the bleeder network tap $V_1$ through a collector load resistor 116. The base bias potential is obtained from the variable operating potential tap $V_3$ in series with the diode 92. The transistor 102 characteristics and component values are selected such that with no signal applied to the A.F.C. system or with a signal applied equal to the reference frequency ($f_0$), a D.C. output voltage of +5 volts is produced at the collector output terminal 114 of the amplifier stage 14 and a D.C. base current sufficient to develop approximately 0.1 volt across each of the series connected resistors 84 and 86 is caused to flow. The tap $V_3$ is adjusted to develop approximately 0.3 volt to ground, and approximately 0.3 volts across the diode 92 due to the current flowing from the tap $V_1$ through the resistor 94 and diode 92. Resistor 94 and diode 92 also function to compensate for changes in the base to emitter voltage due to temperature. Tap $V_2$ provides a reference voltage of +5 volts D.C.

Referring now to FIGURE 6 there is shown the voltage vs. frequency response characteristic curve derived from the discriminator of the present invention, for an applied non-amplitude limited varying frequency input signal following a response curve such as that shown in FIGURE 3.

FIGURE 3 is a television receiver video I.F. amplifier response characteristic with an I.F. video carrier corresponding to the reference frequency $f_0$ appearing midway on the high frequency sloped portion of the curve. Thus, looking at FIGURE 3, it will be seen that the lower frequency video carrier sidebands appear at a greater amplitude than the higher frequency video carrier sidebands. As a result, signal frequencies lower than $f_0$ appearing at the output of the I.F. amplifier are greater in amplitude than signal frequencies higher than $f_0$ appearing at the output of the I.F. amplifier. Applying the non-amplitude limited signal output of the I.F. amplifier to the A.F.C. system having the response characteristic shown in FIGURE 5*b*, the net result is the discriminator output characteristic curve shown in FIGURE 6.

It will be noted that the right side or upper frequency portion of the characteristic curve (FIGURE 6) actually is truncated and does not follow the symmetrical outline indicated by the dashed lines. This is due to a loading of the signal output of the discriminator by the D.C. amplifier when the D.C. amplifier is driven into saturation. The response characteristic which appears at the collector electrode output terminal 114 of the D.C. amplifier 14 after inversion and peak clipping of the discriminator output by the D.C. amplifier 14 is shown in FIGURE 7. This is the response characteristic of the A.F.C. system and is what determines the error correction voltage and frequency pull-in range of the system as will be hereinafter described.

From FIGURE 7 it will be noted that the characteristic curve crosses the frequency or X axis at two points, one of which is at the reference frequency $f_0$, i.e. the frequency to which the discriminator circuit 80 is tuned. the other X axis crossing occurs at a frequency $f_3$ which is lower than the reference frequency $f_0$. It will be noted that in the area of the first crossing ($f_0$), the curve is substantially symmetrical in both amplitude and bandwidth about the X axis with the top and bottom portions of the curve being slightly flattened due to signal clipping by the D.C. amplifier 14.

The circuit operation which produces this response curve (FIGURE 7) will now be described. Referring to FIGURE 1, the value of the signal coupling capacitor 96 is selected such that it has a fairly high impedance at signal frequencies so that only a small amount of the I.F. signal output of the buffer stage 10 is coupled to the discriminator stage 12. Thus, the rectified signal voltage developed across the discriminator load resistors 84 and 86 is of the same order of magnitude as the D.C. bias voltage developed thereacross due to the forward base current of the D.C. amplifier 14.

Assuming that there is no I.F. signal applied to the discriminator 12, or that there is no frequency error between the applied signal and the discriminator reference signal, then effectively the only current flowing through the discriminator load resistors 84 and 86 is base current from the transistor 102. Tracking this current through the resistors 84 and 86, it will be seen that the polarity of the D.C. bias voltage developed thereacross is such that the rectifier 82 is forward biased by the D.C. bias voltage across resistor 84 and the rectifier 88 is reverse biased by the D.C. bias voltage across resistor 86. Thus, in order for the rectifier 88 to conduct, an I.F. signal must be applied to the discriminator with sufficient frequency error so that the frequency detected signal seen by the rectifier 88 is greater in magnitude and opposite in polarity to the bias voltage applied thereacross due to the base current flowing through the resistor 86. Hence there exists a range of frequency error over which the rectifier 88 does not conduct or is cutoff. This unique biasing of the discriminator rectifiers 82 and 88 is what produces the second X axis crossover in the discriminator voltage vs. frequency response characteristic curve and provides a limited bandpass for frequencies lower than the reference carrier of 45.75 mc.

As a means of further illustrating the operation of the discriminator circuit of the invention, in FIGURE 5*a* there is shown a voltage vs. frequency response characteristic curve (A) for the voltage developed across load resistor 84 as a function of the frequency of an amplitude limited signal applied to the system input terminal 44 and the response characteristic curve (B) for the voltage developed across load resistor 86 as a function of the frequency of said amplitude limited input signal. Point C indicates the level at which the rectifier 88 is cutoff by the bias voltage developed across the load resistor 86. The summation of the two curves (A and B) is shown in FIGURE 5*b* wherein the first X axis crossover is shown occurring at a frequency $f_4$ which is lower than the reference carrier $f_0$ and the second X axis crossover occurring at a frequency still lower ($f_5$). The non-symmetry of the response characteristic shown in FIGURE 5*b* is due to the amplitude limiting of the applied signal. In FIGURES 6 and 7 there are shown the response characteristics appearing at the output of the discriminator and D.C. amplifier respectively for a non-amplitude limited varying frequency input signal obtained from the output of the television receiver I.F. amplifier. As was heretofore noted, the response characteristic shown in FIGURE 7 is substantially symmetrical about the X axis and its higher frequency crossing thereof occurs at the reference frequency ($f_0$).

In order to better understand the function and operation of the low frequency limited bandpass as provided by the response characteristic recross (FIGURE 7) the operation of the A.F.C. system is applied to the tuner and I.F. sections of a television receiver will now be described.

Referring to FIGURE 8, a television receiver tuner section 120 which includes an R.F. amplifier 122, a local oscillator 124 and a mixer 126 selects a standard amplitude varying N.T.S. television signal and converts it to one of intermediate frequency for further amplification and selection in the I.F. amplifier 128. A sample of the I.F. output of amplifier 128 is coupled to the input circuit 44 of the A.F.C. buffer amplifier 10. Both the input resonant circuit 40 and output resonant circuit 62 of the amplifier 10 are tuned for maximum signal transfer of a 45.75 mc. carrier. The signal output of the buffer amplifier 10 is applied to the discriminator 12 which is tuned for a reference frequency of 45.75 mc. If the tuner 120 is fine-tuned so that the carrier frequency output of the I.F. amplifier 122 is exactly equal ot 45.75 mc., then the discriminator output due to the input signal is zero volts. For this condition, a D.C. voltage at the collector output terminal 114 of the D.C. amplifier 14 of approximately +5 volts is produced. The collector output voltage from the D.C. amplifier 14 is applied along with a reference voltage of +5 volts from tap $V_2$ to a voltage dependent variable capacitance 130, such as a varicap, coupled to the local oscillator 124 in the receiver tuner 120. The capacitance 130 is conditioned to produce zero change in the local oscillator frequency for an applied collector voltage of +5 volts.

In practice, repeatedly accurate fine tuning of the tuner local oscillator 124 for the production of a video I.F. carrier of 45.75 mc. is unlikely, and more often than not, the local oscillator is mis-fine-tuned to one side or the other of the correct frequency required to produce a 45.75 mc. I.F. video carrier. If the local oscillator is too high, i.e. at a frequency above 45.75 mc., the discriminator output voltage due to the input signal is no longer zero. Instead, a positive voltage is developed across the discriminator output capacitor 90, the magnitude of which depends upon the degree to which the local oscillator is mis-fine-tuned. This positive voltage is amplified by the D.C. amplifier, and due to a polarity inversion by the amplifier, appears at the collector output terminal 114 thereof as a D.C. voltage which is less than the reference voltage of +5 volts. The collector output is then said to be going negative with respect to the 5 volt reference potential. The voltage dependent variable capacitance is conditioned such that when the voltage applied thereto is less than +5 volts, its capacity increases, thereby lowering the local oscillator frequency. Hence, the mechanical mis-fine-tuning resulting in the local oscillator frequency being too high, is compensated for by an automatic electrical fine-tuning which lowers the local oscillator frequency back to substantially the correct one required to produce a video I.F. carrier of 45.75 mc.

On the other hand, if the local oscillator frequency is mis-fine-tuned too low, then the discriminator output due to the input signal is negative or less than zero. Remembering that zero discriminator output produces a +5 volt D.C. amplifier collector output, and that there is a polarity inversion between the signal applied to the D.C. amplifier and the output signal obtained therefrom, for the negative discriminator input to the D.C. amplifier, the collector output voltage is greater than +5 volts and thus the capacitance exhibited by the voltage dependent capacitance decreases providing an increase in the local oscillator frequency which tends to correct the I.F. frequency of the received video signal to a point wherein the error due to the mis-fine-tuning of the local oscillator is substantially eliminated.

The A.F.C. action may be summarized as follows. If any difference exists between the sampled I.F. video carrier and the 45.75 mc. reference frequency of the discriminator 12, a D.C. voltage change is produced at collector output terminal 114 of the D.C. amplifier 14. Therefore, the D.C. amplifier collector output voltage will shift in a positive or negative direction from its initial value of +5 volts, depending on the error correction voltage developed across the discriminator output capacitor 90 and applied to the input of the D.C. amplifier 14. The collector output voltage from the D.C. amplifier 14 is applied to a voltage dependent variable capacitance coupled to the local oscillator in the receiver tuner 120. This changing voltage alters the capacity of the capacitance 124 in such a manner as to alter the local oscillator frequency, and thus the I.F. video carrier, in a direction opposite to the original frequency error that existed from mis-fine-tuning. The A.F.C. system and the variable capacitance network on the tuner combine to correct and maintain the generation of a 45.75 mc. video carrier and 41.25 mc. sound carrier for proper processing of the received television signal and accurate reproduction of the picture and sound information contained therein.

From the preceding discussion, it is apparent that if the wrong polarity collector voltage is fed to the variable capacitance, the frequency error in the local oscillator would not be decreased, but in fact would be increased. For example, if the local oscillator is mis-fine-tuned too low, resulting in an I.F. video carrier less than 45.75 mc., then, as described above, the discriminator output should be less than zero and the D.C. amplifier collector voltage greater than +5 volts in order to achieve proper error reduction. Under the above conditions, if the discriminator output was instead greater than zero and thus the D.C. amplifier output voltage less than +5 volts, the frequency of the local oscillator would be decreased still further instead of increased. Hence, the local oscillator frequency error is increased not decreased. But, in accordance with the present invention and upon reference to FIGURE 7 it will be seen that with respect to the +5 volt reference, if the polarity of the D.C. amplifier collector output voltage to the right of $f_3$ (the point the characteristic curve recrosses the X axis) is correct for error reduction, then the polarity of the collector voltage to the left of recross ($f_3$) is the opposite of that needed for error reduction and so the error is increased. This results in the pushing away, not pulling in, of any I.F. carrier produced by mis-fine-tuning low in frequency of an amount giving rise to an I.F. video carrier of approximately 1.2 mc. lower in frequency than the desired I.F. video carrier frequency of 45.75 mc. The resulting low frequency pull-in range of the A.F.C. system of the present invention then becomes limited or bounded by the polarity reversal of the collector output error correction voltage (with respect to the reference +5 volts) obtained at recross $f_3$, and beyond which no carrier will be pulled toward crossover at $f_0$.

As was mentioned earlier, the buffer stage 10 includes an absorption trap 72 which is adjusted to resonate at approximately 47.25 mc. The trap is adjusted to limit the high frequency pull-in range of the system to within a 1.25 mc. deviation from the reference frequency of 45.75 mc. Since the A.F.C. system will function on any carrier, even wrong ones, yielding a condition called lock-out or lock-up, it is highly desirable to exclude any undesired carriers (i.e. a carrier frequency other than the reference 45.75 mc. frequency to which the video I.F. section of the receiver is tuned) from the operating bandpass of the system. Thus, the system is purposely designed to have a limited pull-in range of approximately ±1.25 mc. on either side of the reference I.F. carrier. The particular carriers undesirable are the 47.25 mc. adjacent channel sound carrier, the 41.25 co-channel sound carrier and the co-channel color carrier located at 42.17 mc. As heretofore mentioned, the limited bandpass characteristic on the low frequency side (low frequency pull-in range) of the reference carrier is achieved due to the dip or X axis recross at $f_3$ of the system voltage vs. frequency response curve, while the limited bandpass characteristic on the high frequency side (high frequency pull-in range) of the reference carrier is due to the absorption trap and its effect on frequencies above its resonant frequency, said frequencies having to pass through the trap and be severely attenuated therein before coming within the high frequency pull-in range of the system. The end result is a well defined A.F.C. pull-in range over which the performnace of the system is excellent, and beyond which no A.F.C. action occurs at all.

Besides creating a limiting of the low frequency pull-in range of the A.F.C. system for protection against co-channel color burst and sound carrier lock-out, the system voltage vs. frequency response characteristic with its X axis recross and resulting dip provide for an A.F.C. correction system which is noise immune. System noise immunity means that the discriminator output voltage is substantially zero and the D.C. voltage at the collector output terminal 114 is approximately +5 volts when there is no input signal applied or when the input signal is pure noise. The noise response is bounded by the response characteristic of the I.F. amplifier in the television receiver and thus for the amplitude vs. frequency response characteristic of the A.F.C. system this results in a system output at the collector terminal 114 of approximately +5 volts with noise input. This is because the area of the system response curve (energy) above the X axis is substantially equal to but opposite in polarity (with respect to the +5 volt reference) to the area of the system response curve (energy) below the X axis. The algebraic sum or average of the two areas (energy) is substantially zero, or slightly negative with respect to the +5 volt reference, thus yielding a D.C. amplifier output voltage of +5 volts or less for an input noise signal. Such a noise signal is applied to the input terminals of the buffer stage 10 whenever the tuner channel selector is switched through unused (noisy) channels. A slight decrease in the +5 volt D.C. amplifier output voltage for a noise signal input would correspond to a slightly high local oscillator frequency setting, which is in the direction that the tuner would be mis-fine-tuned under normal operating conditions. The end result is a system which has substantially the same error correction bandwidth or pull-in range when switching into a desired channel as it does when mis-fine-tuning while remaining on a desired channel.

The A.F.C. system may be disabled by shorting the collector output terminal 114 to the +5 reference voltage tap $V_2$ in the low impedance bleeder network 16.

A particular set of values for the circuit arrangement of FIGURE 1 which has provided satisfactory operation is set forth below. It will be appreciated that these values are given by way of example only:

| | |
|---|---|
| Resistor **30** | 1,500 ohms. |
| Resistor **46** | 5,600 ohms. |
| Resistor **48** | 10,000 ohms. |
| Resistor **56** | 270 ohms. |
| Resistor **84** | 27,000 ohms. |
| Resistor **86** | 27,000 ohms. |
| Resistor **94** | 1,000,000 ohms. |
| Resistor **112** | 100 ohms. |
| Resistor **116** | 10,000 ohms. |
| Capacitor **32** | 1,000 picofarads. |
| Capacitor **38** | 36 picofarads. |
| Capacitor **42** | 0.51 picofarads. |
| Capacitor **52** | 1,000 picofarads. |
| Capacitor **54** | 10 picofarads. |
| Capacitor **62** | 91 picofarads. |
| Capacitor **64** | 1,000 picofarads. |
| Capacitor **70** | 33 picofarads. |
| Capacitor **78** | 130 picofarads. |
| Capacitor **90** | 1,000 picofarads. |
| Capacitor **96** | 15 picofarads. |
| Capacitor **100** | 0.81 picofarads. |
| Capacitor **110** | 1,000 picofarads. |
| Inductor **36** | 6½ turns—No. 16 wire with a 1¼ turn tap. |
| Inductor **50** | 12 microhenries self resonant at 45 mc. |
| Inductor **58** | 3½ turns—No. 16 wire. |
| Inductor **68** | 6½ turns—No. 16 wire. |
| Inductor **74** | 2½ turns—No. 16 wire with a 1¼ turn tap. |
| Transistor **22** | RCA 40238 |
| Transistor **102** | Fairchild FE4002 |
| Rectifier **82** | IN60 |
| Rectifier **88** | IN60 |
| Rectifier **92** | Fairchild FDM1000 |
| B+ | +270 volts D.C. |
| $V_1$ | +10 volts D.C. |
| $V_2$ | +5 volts D.C. |
| $V_3$ | +0.2 to 0.4 volts D.C. |

What is claimed is:

1. An automatic frequency control system for television receivers of the type having a tuner for converting a received television signal having video and sound carrier waves to a corresponding signal of intermediate frequency having video and sound carrier waves, and an intermediate frequency amplifier for said intermediate frequency signal having a frequency-amplitude response which is sloping with respect to the video carrier so that lower frequency video carrier sidebands are amplified more than higher frequency video carrier sidebands comprising:

means coupled to said intermediate frequency amplifier for selecting said video carrier wave;

a frequency responsive network coupled to receive said selected video carrier;

a first circuit loop including at least a portion of said frequency responsive network, a first rectifier and a first load impedance element;

a second circuit loop including at least another portion of said frequency responsive network, a second rectifier and a second load impedance element;

said first circuit loop being more responsive to higher frequency video carrier sidebands than said second circuit loop, and said second circuit loop being more responsive to said lower frequency video carrier sidebands than said first circuit loop;

means coupling said first and second impedance elements to said tuner for providing a direct current voltage indicative of the frequency of said video carrier to control the frequency of the converted intermediate frequency signal; and bias means coupled to said rectifiers for applying different biasing voltages to said first and second rectifiers.

2. A frequency responsive network comprising:

means providing a source of signals having a nominal center frequency;

first means responsive to signals above said nominal frequency including a first rectifier and a first resistor connected in a circuit loop;

second means responsive to signals below said nominal frequency including a second rectifier and a second resistor connected in another circuit loop;

bias means coupled to said rectifiers for applying different biasing voltages to said first and second rectifiers so that the voltage versus frequency characteristic of said frequency responsive network is of a first polarity for a first frequency range, and an alternate polarity for a successively higher frequency range and of the first polarity for a frequency range higher than said first and second frequency ranges; and means coupled to said first and second means for providing a direct current voltage indicative of the frequency of said signal source.

3. A frequency sensitive discriminator circuit for providing a D.C. signal voltage proportional to the frequency of an applied signal within a frequency band centered about a predetermined center frequency comprising:

an inductive element having a tap intermediate between its terminal ends;

a first capacitor connected in shunt with said inductive element to provide a circuit resonant at said center frequency;

input circuit means for coupling said applied signal to said resonant circuit;

means for unbalancing said resonant circuit to provide resonance therein above and below said center frequency between opposite terminals thereof and a ground potential;

a rectifier connected to each of the terminal ends of said inductive element;

an output circuit for said rectifiers comprising two substantially equal resistors serially connected between said rectifiers;

signal conveying means connected between said tap and the junction of said resistors;

means coupled to said rectifiers for biasing one of said rectifiers in a forward direction and the other of said rectifiers in a reverse direction; and a second capacitor connected in parallel with said resistors for deriving therefrom a D.C. signal voltage proportional to the frequency variation of said applied signal about said center frequency.

4. A frequency sensitive discriminator circuit as defined in claim 3 wherein each of said rectifiers includes an anode electrode and a cathode electrode, and in which said connections from the terminal ends of said inductive element are made to the respective cathode electrodes of said rectifiers.

5. A frequency sensitive discriminator circuit as defined in claim 4 and further including D.C. amplifier means coupled to said output circuit.

6. A frequency sensitive discriminator circuit as defined in claim 5 wherein said D.C. amplifier means includes a transistor having emitter, base and collector electrodes, and second signal conveying means connected between said transistor base electrode and one of said resistors; and wherein said bias means develops a direct current voltage across said resistors for forward biasing the base with respect to the emitter.

References Cited

UNITED STATES PATENTS 2,896,018 7/1959 Rhodes et al. -------- 178—5.8

ROBERT L. GRIFFIN, Primary Examiner

ROBERT L. RICHARDSON, Assistant Examiner

U.S. Cl. X.R.

331—1, 26